United States Patent [19]

Dahl

[11] 4,144,832

[45] Mar. 20, 1979

[54] BIRD SPOOK

[76] Inventor: Forrest N. Dahl, 912 W. Summit Ave., Fergus Falls, Minn. 56537

[21] Appl. No.: 865,617

[22] Filed: Dec. 29, 1977

[51] Int. Cl.² .............................................. A01M 29/00
[52] U.S. Cl. .................... 116/22 A; 248/291
[58] Field of Search .................. 116/22 A; D10/111; 248/156, 291

[56] References Cited

U.S. PATENT DOCUMENTS

| | | | |
|---|---|---|---|
| 2,508,974 | 5/1950 | Soditch | 248/291 |
| 2,697,776 | 12/1954 | Wale | 248/291 |
| 2,722,195 | 11/1955 | Rockafeller | 116/22 A |
| 3,085,545 | 4/1963 | Ore | 116/22 A |
| 3,285,554 | 11/1966 | Voelkerding | 248/156 |
| 3,516,631 | 6/1970 | Santucci | 248/205 A |
| 3,637,181 | 1/1972 | Janssen | 248/205 A |
| 4,065,085 | 12/1977 | Gellatly | 248/156 |

*Primary Examiner*—S. Clement Swisher
*Assistant Examiner*—Denis E. Corr
*Attorney, Agent, or Firm*—Melville, Strasser, Foster & Hoffman

[57] ABSTRACT

A bird spook for frightening unwanted birds and other pests from a designated area such as a building, crop field, etc. The spook comprises a thin disc-like plate having at least one light reflecting surface suspended from a supporting arm by a swivel connection. The supporting arm may be attached to any surface of a building by an adjustable support bracket which enables the arm to assume any angle with respect to the building surface to insure freedom of movement of the reflecting plate. Alternatively, the supporting arm is made vertically adjustable for varying the height of the reflecting plate above the ground in crop field protecting installations. Air movements cause the plate to oscillate producing random light reflections annoying to birds and other pests.

5 Claims, 5 Drawing Figures

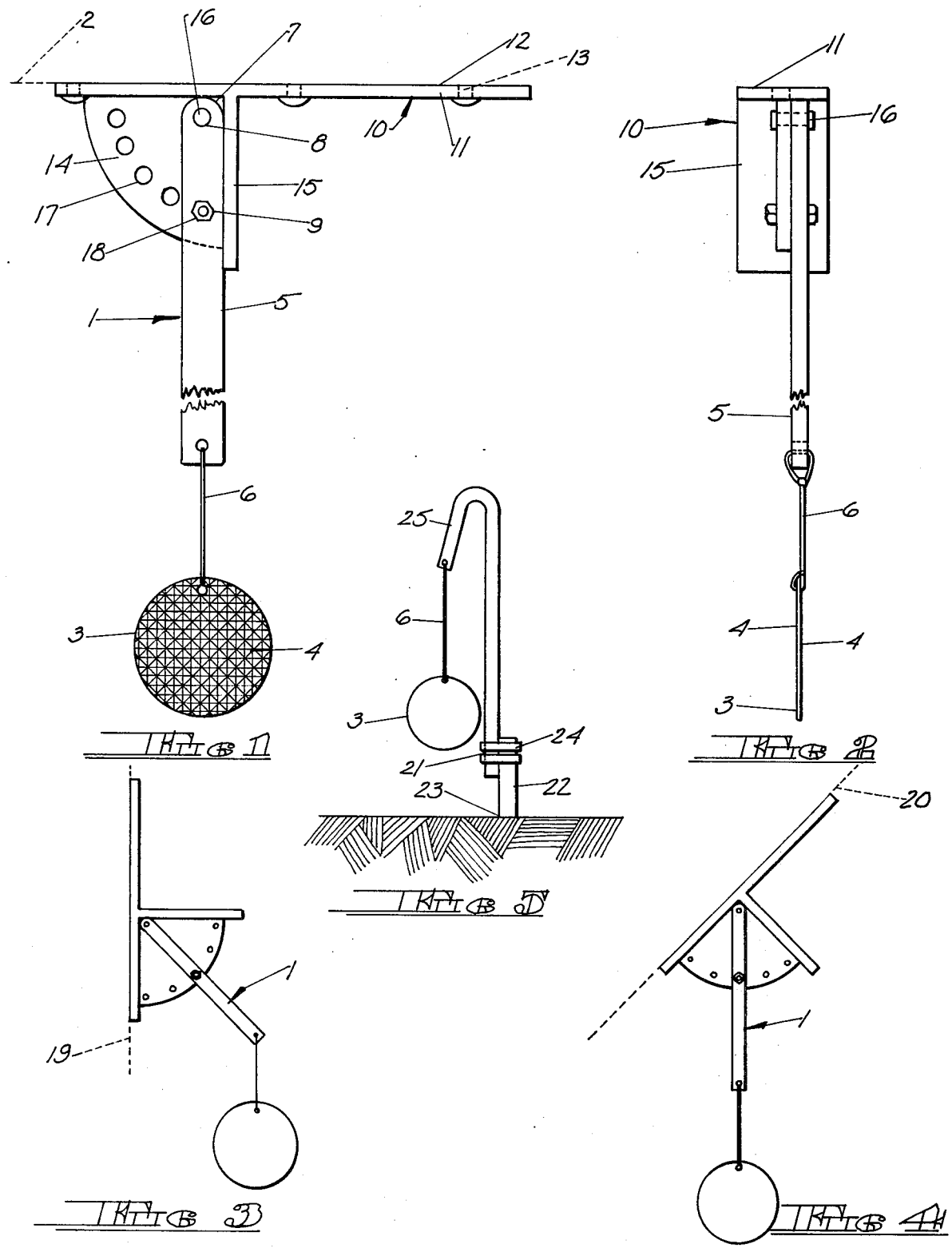

BIRD SPOOK

BACKGROUND OF THE INVENTION

1. Field of the Invention

The present invention relates generally to devices for frightening unwanted animals and more particularly to an oscillating, air movement actuated, light reflecting device for frightening birds and other pests.

2. Description of the Prior Art

Each year common varmints cause the destruction of millions of dollars in property and growing crops. In the past, these pests were vigorously eliminated by shooting, poisoning, electrocution or other means of violent extermination, often with disasterous results to innocuous wildlife. The recent advent of strict environmental controls, as well as increased interest by animal preservation organizations to protect endangered species have permitted both harmless and harmful animals to multiply rapidly with a resulting increase in property damage.

For example, it has been found that wooden structures often used by vacationers as temporary housing in wilderness areas have been virtually destroyed by the incessant boring of nefarious woodpeckers on the roofs, eaves and walls of the structures. Attempts to dissuade these birds from their activity have heretofore proved largely unsuccessful.

Similarly, crop growers have historically been at odds with field birds, such as crows and blackbirds, which threaten growing seed crops. For example, the growing of sunflowers has become an important source of supply of vegetable oils, but has heretofore proved largely unprofitable due to the large flocks of birds which will descend to feed on the crop causing losses of up to 50 percent. Growers have attempted to frighten these birds by the use of noise generators installed at various points about the field, such as high pressure air tanks with timed pressure releases which produce a gun-like report. Not only do these devices represent an expensive capital investment for the crop grower, but the bird flocks soon become accustomed to the periodic sounds, and after a brief sojourn into the air, return to their devastation.

SUMMARY OF THE INVENTION

The bird spook of the present invention provides an inexpensive and reliable wind actuated light reflecting animal deterrent which can be adjustably mounted to protect a designated area, such as a building structure or a crop field. In one embodiment, the apparatus comprises a thin disc-like plate with specular or non-specular light reflecting surfaces supported by a swivel connection such as a slender flexible material from an elongated arm, such that the plate may be caused to oscillate by air movements to produce random light reflections from the reflecting surfaces which have been found to be extremely annoying to animals and therefore effective as an animal deterrent. Slight air movements produce a back and forth motion which cause flashing reflections, while more rapid air movements cause the disc to spin and wave to flash reflections in all directions. The elongated arm may be attached to the designated area to be protected by means of an adjustable support. A support suitable for mounting the spook in association with any surface of a building structure or the like comprises a planar foot plate adapted to be mounted to the building surface and a fin-like arm-supporting flange attached perpendicularly to the surface of the plate opposite the building surface mounting surface. The flange contains a pivot point and a plurality of spaced apertures arranged radially equidistant from the pivot point along one edge of the flange. The mounting end of the arm is pivotally mounted to the pivot point and contains an aperture spaced from the pivot point such that the arm aperture and any one of the plurality of apertures are substantially coaxial for predetermined angular positions of the arm, so that a locking device, such as a pin, nut and bolt, or the like may be inserted through both apertures to prevent angular movement of the arm. Using this type of bracket, the spook may be adjusted to insure that the movement of the reflecting plate will not be inhibited by contact with any building surface.

In a field crop environment, the spook mounting takes the form of a mounting member fixedly secured to the ground and an adjustable clamp slidingly securing the plate supporting arm to the mounting member, such that the height of the plate from the ground may be adjusted in order to make it clearly visible to approaching varmints.

BRIEF DESCRIPTION OF THE DRAWINGS

FIG. 1 is a fragmentary front elevation view of the spook of the present invention mounted on a horizontal building surface.

FIG. 2 is a side elevation view of the spook of FIG. 1.

FIG. 3 is a semi-diagramatic view of the spook of FIG. 1 mounted on a vertical surface.

FIG. 4 is a semi-diagramatic view of the spook of FIG. 1 mounted on a sloping surface.

FIG. 5 is a front elevation view of a field mounted embodiment of the spook of the present invention.

DESCRIPTION OF THE PREFERRED EMBODIMENTS

FIG. 1 illustrates a first embodiment of the bird spook of the present invention, designated generally at 1, for use in association with a horizontal surface 2 of a building structure or the like. Spook 1 comprises a thin disc-like plate 3 of any desired shape, having one or more light reflecting surfaces 4, which may be specular or textured to provide non-specular light reflections. Plate 4 is attached by one edge to one end of a thin elongate arm 5 by means of a swivel connection 6 which may take the form of a long slender flexible material, such as a rope or stranded cord. Swivel connection 6 is of such construction that plate 4 is free to flutter and rotate when exposed to air movements.

The opposite end of arm 5 is rounded as at 7 and contains a substantially round aperture 8 dimensioned to provide pivotal motion of the arm as well as explained hereinafter. Arm 8 also contains a second aperture 9 spaced from aperture 8 for accepting a locking device to prevent rotational movement of the arm.

Arm 8 is pivotally connected by means of aperture 8 to a support bracket shown generally at 10. Bracket 10 comprises a planar foot plate 11 adapted to be mounted by one surface 12 to the building surface. Mounting may be accomplished by threaded fasteners or the like, not shown, extending through spaced apertures, one of which is shown at 13 in foot plate 11. The support bracket may also be fixedly attached to the building surface 2 by providing a pressure sensitive adhesive layer on foot plate surface 12 which can be pressed into contact with surface 2. This latter construction permits the spook to be easily removed from the mounting surface when its use is no longer needed, or when the need for the spook is greater at another location.

Support bracket 10 also contains a fin-like arm-supporting flange 14 attached perpendicularly to the surface of plate 11 opposite building mounting surface 12. Greater rigidity is provided flange 14 by means of a rib 15 having one end attached to foot plate 11 and a surface fixedly attached to a longitudinal edge of flange 14. Rib 15 also acts a pivotal stop for arm 5 as will be described hereinafter. Flange 14 further contains a round outwardly directed pivot pin 16 located proximate the junction of foot plate 11, flange 14 and rib 15, which pivotally communicates with aperture 8 of arm 5. In addition, flange 14 contains a plurality of spaced apertures, one of which is shown at 17, arranged radially equidistant from pivot pin 16 along one edge of flange 14. Aperture 9 of arm 5 is spaced longitudinally from pivot pin 16 such that aperture 9 and one of apertures 17 are substantially coaxial at predetermined angular positions of arm 5, so that arm 5 and flange 14 may be locked together such as by nut and bolt 18 to prevent angular movement of arm 5. As shown in the embodiment of FIG. 1, flange 14 contains five apertures 17, permitting positioning arm 5 at 18° intervals between 0° and 90° with respect to the building surface 2. Greater or fewer apertures 17 may be provided to permit securing arm 5 at other angular positions. In addition, it will be understood that locking device 18 may be a pin or other device adapted to simultaneously communicate with aperture 9 and one of apertures 17 to restrain arm 5. Furthermore, aperture 9 and 17 may be omitted altogether, and arm 5 clamped directly to flange 14 by means of a C-clamp or the like.

It will be observed in the embodiment of FIG. 1 that rib 15 abuts one edge arm 5 when the arm is perpendicular to building surface 2, thereby preventing further angular rotation. This feature, while desirable, may be omitted without adversely effecting the over all operation of the spook.

FIG. 3 illustrates diagramatically spook 1 secured to a vertical surface 19. Likewise, FIG. 4 illustrates spook 1 secured to a sloping surface 20, such as a roof overhang. In any of the embodiments of FIG. 1–FIG. 4, the angular position of arm 5 with respect to the mounting building surface is adjusted so that plate 3 is not obstructed in its movement by any part of the building structure. Furthermore, the angular position of arm 5 may be adjusted to provide maximum visibility of plate 3 to deter varmints and the like. It will thus be understood that the spook may be mounted on any type of building and is intended to be left alone for long periods of time without the need for service or adjustments. In addition, only a slight air movement is necessary to cause back and forth flashing reflections from surfaces 4 of plate 3, while more rapid air movements will cause plate 3 to produce flashing reflections in all directions. The freedom of movement of the spook insures that it will not be damaged by storms, etc.

FIG. 5 illustrates a second embodiment of the spook of the present invention installed in a field crop protecting environment. Here plate 3 is suspended by means of swivel connection 6 to the downwardly directed end of a dog-leg shaped mounting bracket 25. The swivel connection end of bracket 25 is spaced from the vertical section of the bracket so that plate 3 is free to move without obstructing the vertical part of the bracket. The lower end 21 of the vertical portion of bracket 25 is slidably secured to one end of a vertical mounting member 22, the other end of which is fixedly mounted in the ground as at 23. End 21 of bracket 25 may be slidingly secured to mounting member 22 by one or more adjustable clamps 24 which when loosened permit bracket 25 to be adjusted vertically. Once bracket 25 is adjusted to insure that plate 3 is the proper vertical distance from the ground for maximum visability, clamps 24 may be tightened to prevent further movement. Thereafter the spook may be left in place to perform its function in a manner similar to that described in connection with the embodiment of FIG. 1–FIG. 4.

There has thus been described a simple and effective device for detering animals from designated areas to prevent property damage. The spook is particularly useful in that it may be secured directly to the area to be protected to provide maximum protection. It will be understood that various changes in the details, materials, steps and arrangements of parts, which have been herein described and illustrated in order to explain the nature of the invention, may be made by those skilled in the art within the principle and scope of the invention as expressed in the appended claims.

The embodiments of the invention in which an exclusive property or privilege is claimed are as follows:

1. A bird spook for frightening unwanted birds and other pests from a surface of a building or the like comprising a thin disc-like plate having at least one light reflecting surface, an elongated arm having a support mounting end, a swivel connection attaching said plate to said arm for allowing motion of said plate in any direction, and an adjustable support securing said arm to said building surface and operable to incline said arm at a predetermined angle with respect to said building surface, said support comprising a planar foot plate adapted to be mounted to a planar mounting surface a of said building surface, fin-like arm-supporting flange attached perpendicularly to the surface of said foot plate opposite said planar mounting surface of said building surface, said flange containing a pivot point and a plurality of spaced apertures arranged radially equidistant from said pivot point along one edge of said flange, the support mounting end of said arm being pivotally mounted to said pivot point and containing an aperture spaced from said pivot point such that said arm aperture and anyone of said plurality of apertures are substantially coaxial at predetermined angular positions of said arm said arm being limited in motion by a rib normal to said planar foot plate, and locking means communicating with said coaxial apertures to prevent angular movement of said arm, whereby said bird spook may be mounted on any type of building surface and said plate may be caused to oscillate by air movements to cause random light reflections from said reflecting surface.

2. The spook according to claim 1 including means for removably mounting support to said said building surface, said means comprising a pressure sensitive adhesive affixed to said support.

3. The spook according to claim 1 wherein both sides of said plate are reflecting.

4. The spook according to claim 1 wherein said reflecting surface is textured to provide non-specular reflections.

5. The spook according to claim 1 wherein said swivel connection comprises a long slender flexible material.

* * * * *